United States Patent
Bruhat

(10) Patent No.: US 10,480,454 B2
(45) Date of Patent: Nov. 19, 2019

(54) BLEED FLOW DUCT FOR A TURBOMACHINE COMPRISING A PASSIVELY ACTUATED VARIABLE CROSS SECTION VBV GRATING

(71) Applicant: Safran Aircraft Engines, Paris (FR)

(72) Inventor: Jean-Frederic Pierre Joseph Bruhat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 211 days.

(21) Appl. No.: 15/736,636

(22) PCT Filed: Jun. 16, 2016

(86) PCT No.: PCT/FR2016/051457
§ 371 (c)(1),
(2) Date: Dec. 14, 2017

(87) PCT Pub. No.: WO2016/203157
PCT Pub. Date: Dec. 22, 2016

(65) Prior Publication Data
US 2018/0195465 A1 Jul. 12, 2018

(30) Foreign Application Priority Data
Jun. 17, 2015 (FR) ...................... 15 55549

(51) Int. Cl.
*F02K 3/075* (2006.01)
*F01D 17/14* (2006.01)
*F02C 9/18* (2006.01)

(52) U.S. Cl.
CPC ............ *F02K 3/075* (2013.01); *F01D 17/148* (2013.01); *F02C 9/18* (2013.01); *F05D 2220/323* (2013.01)

(58) Field of Classification Search
CPC .... F02C 9/18; F02C 6/08; F02K 3/075; F01D 17/148
See application file for complete search history.

(56) References Cited

U.S. PATENT DOCUMENTS 5,261,228 A * 11/1993 Shuba ................... F01D 17/105
60/226.3
5,706,649 A * 1/1998 Robinson ................ F02K 1/008
239/265.13

(Continued)

FOREIGN PATENT DOCUMENTS

FR 3034462 A1 10/2016
WO 2015/011392 A1 1/2015

OTHER PUBLICATIONS

Preliminary Research Report and Written Opinion received for French Application No. 1555549, dated Apr. 21, 2016, 9 pages (1 page of French Translation Cover Sheet and 8 page of original document).

(Continued)

*Primary Examiner* — Craig Kim
(74) *Attorney, Agent, or Firm* — Womble Bond Dickinson (US) LLP

(57) ABSTRACT

The invention relates to a hub (2) of an intermediate casing (1) for a bypass turbomachine comprising: —a bleed stream duct (18), —a bleed valve, comprising a mobile door at the inlet orifice to the bleed stream duct (18), —a set of bleed vanes (22) which are mounted with the ability to rotate about a pivot (26) in the bleed stream duct (18) between an open configuration in which a flow of air coming from the inlet orifice (4) passes between the bleed vanes (22) and a closed configuration, the pivot (26) for each bleed vane (22) being closer to its leading edge (BA) than to its trailing edge (BF).

9 Claims, 2 Drawing Sheets

(56) References Cited

U.S. PATENT DOCUMENTS

| | | | | |
|---|---|---|---|---|
| 5,845,482 | A | * | 12/1998 | Carscallen ............ F01D 17/105 |
| | | | | 60/785 |
| 8,511,096 | B1 | * | 8/2013 | Haugen .................... F02K 1/34 |
| | | | | 60/785 |
| 10,221,773 | B2 | * | 3/2019 | Moniz ....................... F02C 6/08 |
| 2008/0112795 | A1 | * | 5/2008 | Lee ......................... F01D 5/081 |
| | | | | 415/115 |
| 2013/0269366 | A1 | * | 10/2013 | Haugen .................... F02C 6/08 |
| | | | | 60/783 |
| 2015/0345425 | A1 | * | 12/2015 | Roberge ................. F02K 1/386 |
| | | | | 415/1 |

OTHER PUBLICATIONS

International Search Report and Written Opinion received for PCT Patent Application No. PCT/FR2016/051457, dated Sep. 30, 2016, 14 pages (6 pages of English Translation and 8 pages of Original Document).

International Preliminary Report on Patentability received for PCT Patent Application No. PCT/FR2016/051457, dated Dec. 28, 2017, 12 pages (6 pages of English Translation and 6 pages of Original Document).

* cited by examiner

BLEED FLOW DUCT FOR A TURBOMACHINE COMPRISING A PASSIVELY ACTUATED VARIABLE CROSS SECTION VBV GRATING

FIELD OF THE INVENTION

The invention relates to the general field of bypass turbine engines, and more particularly to discharge valves allowing the regulation of the air leaving a compressor of such a turbine engine, said valves sometimes being designated by their acronym VBV (variable discharge valves).

TECHNOLOGICAL BACKGROUND

A bypass turbine engine generally comprises, from upstream to downstream in the gas flow direction, a shrouded fan, an annular primary flow space and an annular secondary flow space. The air mass aspired by the fan is therefore divided into a primary flow F1, which circulates in the primary flow space, and a secondary flow F2, which is concentric with the primary flow F1 and circulates in the secondary flow space.

The primary flow space passes through a primary body comprising one or more compressor stages, for example a lowpressure compressor and a highpressure compressor, a combustion chamber, one or more turbine stages, for example a highpressure turbine and a lowpressure turbine, and a gas exhaust nozzle.

Moreover, in a manner known per se, the turbine engine comprises an intermediate casing the hub whereof is arranged between the low pressure compressor casing and the highpressure compressor casing. The intermediate casing comprises discharge valves or VBV, the role of which is to regulate the flow rate at the inlet of the highpressure compressor so as, in particular, to limit the risks of surge in the low pressure compressor by discharging a portion of the air outside the primary flow space.

As illustrated in FIG. 1, which is a partial axial section view of a dual-spool bypass airplane turbojet of a known type, the hubs 2 of the intermediate casings usually comprise two coaxial annular shrouds, respectively inner 3 and outer 5, mutually connected by an upstream transverse flange 7 and a downstream transverse flange 9.

The upstream flange 7 is arranged downstream of the lowpressure compressor while the downstream flange 9 is arranged upstream of the highpressure compressor.

The inner shroud 3 delimits the annular primary flow space 10 of the primary flow F1 of the turbine engine and comprises air inlet openings 4 distributed circumferentially around an axis X of the inner shroud 3 (which is coaxial with the hub 2), which are blocked by a corresponding discharge valve 12 designed to regulate the flow rate of the highpressure compressor.

Such a discharge valve 12 can take the form of a door which is mounted pivotally on the inner shroud 3 between a closed position, in which the door 12 closes the corresponding inlet opening 4 and is flush with the inner shroud 3 of the intermediate casing 1 while forming a substantially continuous surface to best reduce the risks of aerodynamic perturbations of the primary flow F1, and an open position (see FIG. 1), in which the door 12 protrudes radially toward the inside with respect to the inner shroud 3 and thus allows the collection of a portion of the primary flow F1 in the primary flow space 10.

For its part, the outer shroud 5 delimits the secondary flow space 14 of the secondary flow F2 of the turbine engine, and comprises air outlet openings 6 arranged downstream of the downstream transverse flange 9 and distributed circumferentially around the axis X.

When the airflow rate which can enter the highpressure compressor is reduced, a surplus of air in the secondary flow space 14 can then be bled through these outlet openings 6, thus avoiding surge phenomena which can lead to deterioration or complete destruction of the lowpressure compressor.

The turbine engine further comprises discharge streams, formed between the inlet openings 14 and the outlet openings 6. Each discharge stream is delimited, from upstream to downstream, between an inlet opening 4 and an associated outlet opening 6, by an intermediate annular space 16, delimited by the shrouds 3, 5 and the transverse flanges 7, 9, then by a discharge stream duct 18 (also known by the acronym kit engine), configured to guide the air flow to the secondary flow space 14. The discharge stream duct 18 further comprises an intermediate opening 19, which leads into the intermediate space 16 at the upstream surface of the downstream transverse flange 9.

The doors 12, the intermediate spaces 16 and the associated discharge stream ducts 18 thus form together a system for discharging air to the secondary flow space 14 of the turbine engine.

The hub 2 of the intermediate casing 1 therefore includes a plurality of such systems distributed around the axis X.

Moreover, when a door 12 of a discharge valve is in the open position, an air flow scooped by it passes through the intermediate space 16, the corresponding discharge stream duct 18, then reaches the secondary flow space 14 through a discharge grating 20 comprising fins, or the VBV grating. The discharge streams and the fins of the VBV gratings 20 are inclined with respect to the flow direction of the secondary flow F2, so as to redirect the air flow from the primary flow space and align it as much as possible with that of the secondary flow F2.

Modern turbine engines operate at ever greater dilution ratios (better known as bypass ratios). In order to limit shock losses in supersonic flows at the tip of the fan, the angular rotation speed of the fan is reduced. This has the effect of reducing the compression ratio of the fan. At lower compression ratios, the head and secondary flow F2 separation losses therefore have a greater impact and must be limited as much as possible. These head losses are present in the zone having surface irregularities in particular.

The Applicant, however, has noted the fact that the presence of the VBV grating 20 created a stream irregularity capable of create head losses when the discharge stream is not discharging (i.e. when the door 12 of the discharge valve is in the closed position), typically during cruise. In fact, the VBV grating 20 forms a porous surface into which air can enter and capable of create head losses and/or separation layer in the secondary flow F2.

Proposed therefore, in document FR 15 52811, filed 1 Apr. 2015 in the Applicant's name, is an intermediate casing hub for a bypass turbine engine comprising:

a set of discharge fins, attached in the discharge stream duct, at the outlet opening of the outer shroud, and blocking means, configured to adjust a passage cross-section of the outlet opening depending on the position of the movable door.

The blocking means are movable between an open configuration, in which an air flow from the inlet opening is able to pass through the discharge fins, and a closed configuration, in which the blocking means block a passage cross-section of the outlet opening. These blocking means can in particular be formed by discharge fins which are then mounted pivotally in the discharge stream duct between the open configuration and the closed configuration.

However, these blocking means require the implementation of servo control means and therefore the addition of components into the engine and therefore the increase of its mass. Typically, in patent application FR 15 52811, the coupling is accomplished by means of a digital control system or a servo-control system mechanically or hydraulically connecting the door to the blocking means and thus ensuring their simultaneous opening and closing.

Document US 2013/269366 describes an intermediate casing hub comprising a discharge stream duct which leads into a secondary flow space through an outlet opening and discharge fins, the opening and the closing of the discharge fins being synchronized by means of a pivoting rod.

SUMMARY OF THE INVENTION

One objective of the invention is therefore to propose a bypass turbine engine comprising discharge valves allowing a reduction in the surface irregularities which can create head losses or separate the secondary flow in the secondary stream, which is simple and easy to implement, without increasing the mass of the turbine engine in the process.

To this end, the invention proposes an intermediate casing hub for a bypass turbine engine, said hub comprising:
- an inner shroud configured to delimit a primary flow space of the primary gas flow of the turbine engine,
- an outer shroud configured to delimit a secondary flow space of the secondary gas flow of said turbine engine,
- a discharge stream duct, extending between the inner shroud and the outer shroud, said discharge stream duct leading on the one hand into the primary flow space through an inlet opening formed in the inner shroud, and on the other hand into the secondary flow space through an outlet opening formed in the outer shroud,
- a door that is movable between a closed position, in which the door closes a passage cross-section of the inlet opening, and an open position, in which the door opens a passage cross-section of the inlet opening, and
- discharge fins comprising a leading edge and a trailing edge, opposite the leading edge.

The discharge fins are rotatably mounted around a pivot in the discharge stream duct at the outlet opening between an open configuration, in which an air flow from the inlet opening is able to pass between the discharge fins, and a closed configuration, in which the discharge fins block a passage cross-section of the outlet opening. The pivot of each discharge fin is closer to its leading edge than to its trailing edge.

In one embodiment, the discharge fins comprise a downstream portion, extending between the pivot and the trailing edge, the downstream portion and the upstream portion of the discharge fins having a different density.

Certain preferred but nonlimiting features of the casing hub described above are the following, taken alone or in combination:
- in the closed configuration, the discharge fins create a substantially continuous surface,
- each discharge fin is in contact with an adjacent discharge fin so as to form the substantially continuous surface,
- the downstream portion is hollow,
- the inner shroud has a revolution axis and the hub comprises a plurality of discharge fins distributed circumferentially around said axis, at least one portion of said discharge fins having a different density distribution depending on their angular position around the axis,
- each discharge fin is equipped with a spring system attached on the one hand to the pivot and on the other hand to the discharge stream duct so as to apply a moment to the discharge fin tending to bring said fin into its open configuration, and
- the hub further comprises a damping system of the discharge fins.

According to a second aspect, the invention also proposes an intermediate casing for a bypass turbine engine comprising a hub as described above, as well as a turbine engine comprising such an intermediate casing.

BRIEF DESCRIPTION OF THE DRAWINGS

Other features, aims and advantages of the present invention will be more apparent upon reading the detailed description that follows, and with reference to the appended drawings given by way of nonlimiting examples and in which.

DETAILED DESCRIPTION OF AN EMBODIMENT

Figure 1:
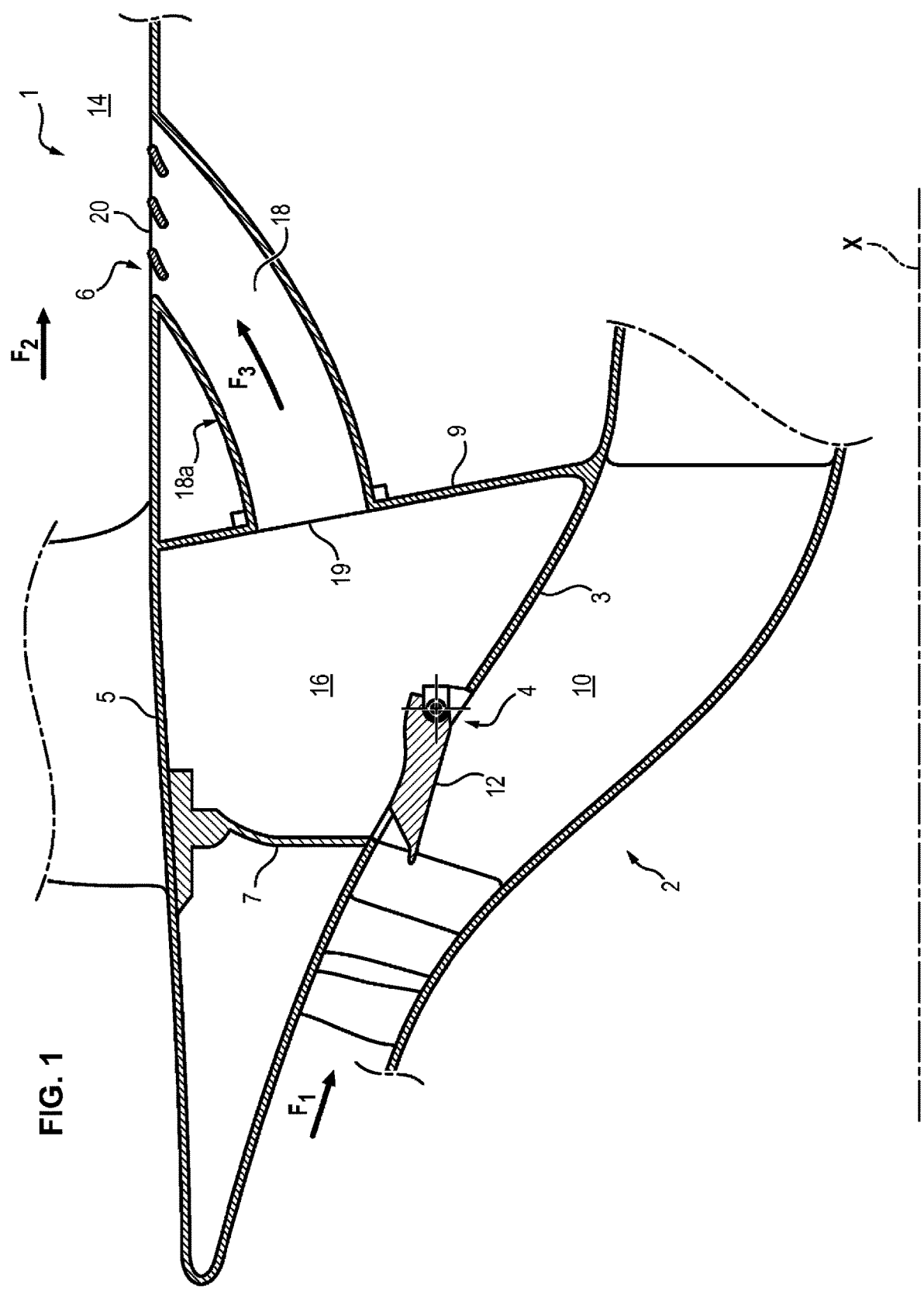
FIG. 1, which has been described above, is an axial section view of a hub for an intermediate casing known from the prior art.

Hereafter, an intermediate casing hub 2 for a bypass turbine engine and an associated intermediate casing with now be described with reference to the appended figures.

The intermediate casing hub parts 2 of the prior art already described are also present in the embodiments hereafter.

In particular, an intermediate casing hub 2 according to the invention comprises:
- an inner shroud 3 configured to delimit a primary flow space 10 of the primary gas flow of the turbine engine,
- an outer shroud 5 configured to delimit a secondary flow space 14 of the secondary gas flow of said turbine engine, and
- a discharge stream duct 18, extending between the inner shroud 3 and the outer shroud 5.

The discharge stream duct 18 leads into the primary flow space 10 through an inlet opening 4 formed in the inner shroud 3 and into the secondary flow space 14 through an outlet opening 6 formed in the outer shroud 5. As previously described, the hub 2 can further comprise an intermediate space 16, delimited by the inner 3 and outer 5 shrouds on the one hand and by the upstream 7 and downstream 9 flanges on the other hand, interleaved between an upstream end (defining the intermediate opening) of the discharge stream duct 18 and the inlet opening 4.

The inlet opening 4, which is formed in the inner shroud 3 of the hub 2, can be selectively opened or closed by a door 12 depending on the flight phases of the turbine engine. Preferably, the door 12 is movable between a closed position, in which the door 12 closes the inlet opening 4, and an open position, in which the door 12 opens the inlet opening 4. For example, the door 12 can be mounted hinged on the inner shroud 3 or comprise a sliding trap door.

The hub 2 further comprises a VBV grating 20 comprising a set of discharge fins 22, attached in the discharge stream duct 18 at the outlet opening 6 of the outer shroud 5 and configured to orient a discharge air flow F3 from the primary flow space 10 and inject it into the secondary flow space 14 in a direction substantially parallel to that of the secondary flow F2, so as to reduce head losses in the secondary flow space 14.

The discharge stream duct 18 further comprises blocking means 22, configured to adjust a passage cross-section of the outlet opening 6 depending on the position of the door 12.

To this end, the blocking means 22 are movable between an open configuration, in which an air flow from the inlet opening 4 is capable of passing between the discharge fins 22, and a closed position, in which the blocking means 22 block a passage cross-section of the outlet opening 6.

In one embodiment, in the closed configuration, the blocking means 22 are flush with the outer shroud 5 and form a substantially continuous surface so as to limit surface irregularities capable of creating head losses or separating the secondary flow F2.

Thus, when the door 12 is in the closed position and no air flow is collected by the discharge valve in the primary flow space 10, the blocking means 22 close the passage cross-section of the outlet opening 6, which allows reducing the surface irregularities in the secondary flow space 14 and therefore limiting the head losses that can result from it. In this configuration, the secondary flow space is substantially analogous to the conventional flow spaces of turbine engines without discharge valves 12. This configuration, in which the doors 12 and the blocking means 22 are closed, corresponds to 70% of the cycle of operation of the turbine engine (cruise).

On the other hand, when air must be collected in the primary flow space 10, for example during a takeoff or landing phase, the door 12 is in the open position and the blocking means 22 are brought into the open position so as to open the passage for the discharge air and to allow its introduction into the secondary flow F2.

Figure 2A:
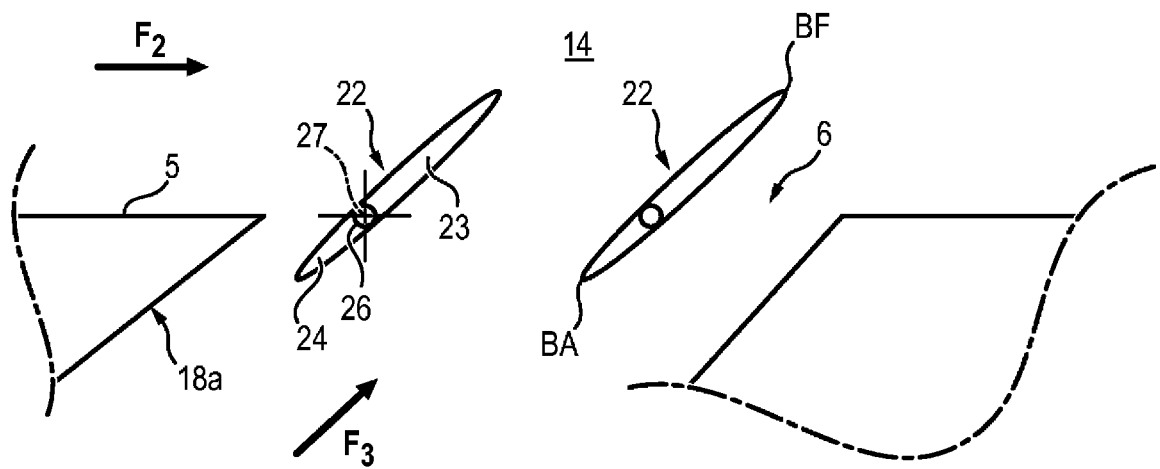
FIGS. 2a and 2b are schematic section views of an exemplary embodiment of discharge fins in the open configuration and in the closed configuration, respectively.
Figure 2B:
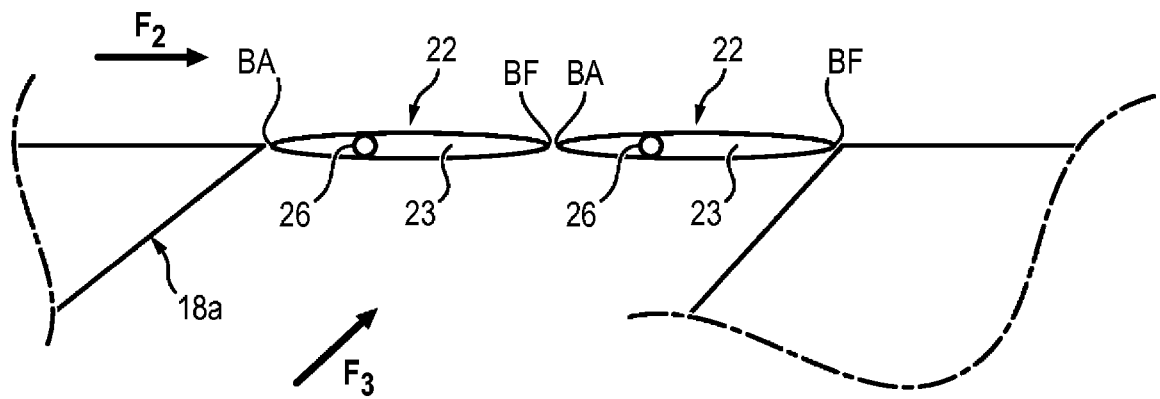

In the exemplary embodiment illustrated in FIGS. 2 to 4, the blocking means are formed by the discharge fins 22. To this end, the discharge fins 22 are mounted pivotally in the discharge stream duct 18, between the open configuration and the closed configuration.

In this manner, in the open configuration (FIG. 2a), the discharge fins 22 extend in the usual manner so as to deflect the discharge air flow F3 and introduce it into the secondary flow F2 while reducing head losses, while in the closed configuration (2b), they are flush with the outer shroud while extending into the continuation of it and thus blocking the passage cross-section of the outlet opening 6.

In one embodiment, each discharge fin 22 is in contact with one adjacent discharge fin 22 so as to form the substantially continuous surface. To this end, the pivot connections 26 of the two adjoining discharge fins 22 are separated by a distance substantially equal to or slightly smaller than one length of the fins 22. In this manner, the surface formed by the discharge fins 22 in the closed configuration is substantially continuous, and in any case generates negligible surface irregularities in comparison with the conventional discharge fin gratings 22 which are fixed with respect to the duct 18.

To this end, the discharge fins 22 are rotatably mounted in the discharge stream duct 18 around a pivot 26 between the open configuration and the closed configuration. Preferably, the pivots 26 of the discharge fins 22 are mounted at the outlet opening 6.

The pivots 26 can be formed integrally with the discharge fins 22, or applied and attached to the discharge fins 22.

This embodiment has the advantage of not weighing down the hub 2, by using parts already present in it (the fins 22), and consequently reducing the specific fuel consumption of the turbine engine by reducing head losses and separation of the secondary flow F2 in cruise.

Each discharge fin 22 comprises a leading edge BA and a trailing edge BF, opposite the leading edge BA. The leading edge BA of a fin 22 corresponds to the anterior portion of its aerodynamic profile. It faces the discharge air flow F3 and divides it into a pressure side air flow and a suction side air flow. For its part, the trailing edge BF corresponds to the posterior portion of the aerodynamic profile, where the pressure side and the suction side flows rejoin.

In order to allow the displacement of the discharge fins 22 from one configuration to another without requiring active servo control, the pivot 26 of each discharge fin 22 is closer to its leading edge BA than to its trailing edge BF. Moreover, the rotation axis 27 of each pivot 26 is preferably aligned with or has a small offset from the outer shroud 5 (at the passage cross-section of the outlet opening 6). In this manner, in the open configuration, the discharge fins 22 extend partially into the secondary flow space, while they form a substantially continuous surface in the continuation of the outer shroud 5 in the closed configuration.

Thus, when there is no air flow in the discharge stream duct 18, the portion 23 (called the downstream portion 23) of the discharge fins 22 which extends between the pivot 26 and the trailing edge BF extend into the secondary flow space. The secondary flow F2 therefore exerts an aerodynamic load on this portion 23 of the discharge fins 22, which tends to fold it against discharge stream duct 18 so as to align said fins 22 with the outer shroud 5. Thus, when there is no discharge air flow F3 in the discharge stream duct 18, the fins are positioned passively (i.e. without servo control) in their closed configuration.

When a discharge air flow F3 passes through the discharge stream duct 18, this discharge air flow F3 applies greater aerodynamic loads to the downstream portion 23 of the discharge fins 22 (i.e. the portion of the fins 22 which extends between the pivot 26 and the trailing edge BF) because this portion is larger than the upstream portion 24 (i.e. the portion of the fins 22 which extends between the pivot 26 and the leading edge BA). If the discharge air flow F3 applies a greater force on the downstream portion 23 of the discharge fin 22 than the secondary flow F2 and gravity, the fin 22 pivots around the pivot 26 and aligns itself with the discharge air flow F3, thus allowing the discharge air flow F3 to leave the discharge stream duct 18.

In order to reinforce the moment applied by the discharge air flow F3 on the discharge fins 22 and to guarantee that the fins 22 open regardless of the secondary discharge flow F2 rate, the configuration of the discharge fins 22 can be modified so as to increase the effect of the aerodynamic loads applied to the downstream portion 23 of the fins 22, or on the contrary reducing the effects of the loads applied by the secondary flow F2 and by gravity.

For example, the position of the pivot 26 of each discharge fin 22 can be adjusted with respect to the leading edge BA and to the trailing edge BF so as to increase the lever arm between the pivot 26 and the trailing edge BF and therefore the moment applied by the discharge air flow F3 to the downstream portion 23 of the fins 22.

As a variant, the local density of the discharge fins 22 (and therefore the position of their center of gravity) can be adjusted by increasing the mass of all or a portion of the upstream portion 24 of the fins 22 and/or by reducing the mass of all or a portion of the downstream portion 23 of the fins 22. For example, the downstream portion 23 of each discharge fin 22 can be partially hollow while the upstream portion 24 is solid. This modification of the position of the center of gravity of the discharge fins 22 by means of the distribution of their density thus allows modification of the resulting moment of the aerodynamic and gravity loads on the fins 22. In particular, in comparison with a discharge fin with a homogeneous density:

the resulting moment of the aerodynamic loads applied by the discharge air flow F3 on the downstream portion 23 of the discharge fin 22 will be greater, and the resulting moment of the aerodynamic loads applied by the secondary flow F2 and by gravity will be smaller.

According to another variant, the behavior of the discharge fins 22 can also be modified by enlarging or by reducing the discharge fin 22 in the zone adjoining its leading edge BA.

For example, the thickness of the leading edge BA of the discharge fin 22, or if appropriate of the entire profile of the fin 22 in a zone adjoining the leading edge BA, can be increased. It is possible in particular to carry out a circular biasing so as to increase the internal volume of the discharge fin 22. Here too, this local enlargement allows the center of gravity of the discharge fin 22 to be displaced to increase the resulting moment applied to its downstream portion 23 and to counterbalance the resulting moment applied to its upstream portion 24.

As a variant, the thickness of the leading edge BA can be reduced, for example by carrying out a pointed biasing of said leading edge BA.

Analogously, the thickness of the trailing edge BF can be increased or reduced so as to modify the position of the center of gravity of the discharge fin 22.

According to yet another variant, the discharge fin 22 can be equipped with a spring system, attached on the one hand to the pivot 26 and on the other hand to the discharge stream duct 18 (preferably on a wall which does not extend into the discharge air flow F3) so as to apply a moment to the discharge fin 22 tending to bring said fin 22 into its open configuration. The stiffness of the spring system is then selected so as to ensure that the fin 22 returns to its open configuration when the door 12 is in the open position.

Of course, these four variant embodiments for reinforcing the moment applied by the discharge air flow F3 on the discharge fins 22 can be combined.

Thus, thanks to the adjustment of the position of the pivot 26 with respect to the leading edge BA and to the trailing edge BF, the possible modification of the fins 22 for the purpose of displacing their center of gravity and to the optional spring system, blocking means capable of passing from the open position to the closed position automatically are obtained, depending on the secondary flow F2 and the discharge air flow F3.

It will be noted that, depending on the angular position of the discharge fins 22 around the axis X of the inner shroud 3 (for example 12 o'clock or 6 o'clock), the effects of gravity on the configuration of the discharge fins 22 are different. Typically, for discharge fins at 12 o'clock (or opposite the ground with respect to the axis X), the moment applied to the fins 22 and resulting from gravity tends to bring the fins 22 into their closed configuration, while for the discharge fins positioned at 6 o'clock (or opposite the position at 12 o'clock with respect to the axis X), the moment applied to the fins 22 and resulting from gravity has a tendency to bring the fins 22 into their open configuration.

Consequently, the position of the pivot 26 with respect to the leading edge BA and to the trailing edge BF, and possibly the position of the center of gravity of the fins 22, can be different depending on their angular position around the axis X so as to take into account the effects of gravity on the configuration of the discharge fins 22.

Likewise, the angle between a given discharge fin 22 and the upstream wall 18a (in the gas flow direction in the hub 2) of the discharge stream duct can vary depending on the axial position of the fin 22 (along the axis X), so as to take into account the local discharge flow direction. For example, the discharge fin 22 closest to the upstream wall 18a of the duct 18 can be more inclined with respect to the cross-section of the outlet opening 6 than the discharge fin 22 most distant from this wall 18a. It is possible in particular to refer to application FR 15 52808 filed on 1 Apr. 2015 on behalf of the Applicant for more information on the respective inclination of the different discharge fins 22 in the discharge stream duct 18.

In any case, the open configuration of each discharge fin 22 can be adjusted depending on the optimal angle to be attained so as to limit the head losses during the introduction of the discharge air flow F3 into the secondary stream by adjusting the position of the pivot 26 with respect to the leading edge BA and to the trailing edge BF of each fin 22 and/or the position of their center of gravity, as indicated above.

Whether the discharge stream duct 18 is discharging (that is crossed by a discharge air flow F3) or not, the discharge fins 22 are capable of vibrating, in that they are free in rotation around their pivot 26. In order to ensure that the fins 22 change configuration only when the discharge stream duct 18 becomes discharging or stops to be discharging, the pivot 26 of the fins 22 can be equipped with a vibration damping system, attached on the one hand to the pivot 26 and on the other hand to the discharge stream duct 18 (preferably to a wall which does not extend into the discharge air flow F3). Such a damping system can in particular comprise a spring system, hydraulic damping, etc. If appropriate, the damping system can also participate in the reinforcement of the moment applied by the discharge air flow F3 on the discharge fins 22 to allow the discharge fins 22 to come into the open configuration.

The discharge fins 22 can in particular be of the butterfly fin type, or any other form suitable for deflecting the air flow from the primary flow space 10 so as to align it with the secondary flow F2.

The invention claimed is:

1. An intermediate casing hub for a bypass turbine engine, said hub comprising:

an inner shroud configured to delimit a primary flow space of the primary gas flow of the turbine engine, an outer shroud configured to delimit a secondary flow space of the secondary gas flow of said turbine engine, a discharge stream duct extending between the inner shroud and the outer shroud, said discharge stream duct leading on the one hand into the primary flow space through an inlet opening formed in the inner shroud, and on the other hand into the secondary flow space through an outlet opening formed in the outer shroud, a door that is movable between a closed position, in which the door closes a passage cross-section of the inlet opening, and an open position, in which the door opens a passage cross-section of the inlet opening, and discharge fins comprising a leading edge and a trailing edge opposite the leading edge, said discharge fins being rotatably mounted around a pivot in the discharge stream duct at the outlet opening between an open configuration, in which an air flow from the inlet opening is able to pass between the discharge fins, and a closed configuration, in which the discharge fins block a passage cross-section of the outlet opening, the intermediate casing hub wherein the pivot of each discharge fin is closer to its leading edge than to its trailing edge and in that the discharge fins comprise a downstream portion extending between the pivot and the trailing edge and an upstream portion extending between the pivot and the leading edge, the downstream portion and the upstream portion of the discharge fins having a different density.

2. The intermediate casing hub according to claim 1, wherein, in the closed configuration, the discharge fins create a substantially continuous surface.

3. The intermediate casing hub according to claim 2, wherein each discharge fin is in contact with an adjacent discharge fin so as to form the substantially continuous surface.

4. The intermediate casing hub according to claim 1, wherein the downstream portion is hollow.

5. The intermediate casing hub according to claim 1, wherein the inner shroud has a revolution axis and the hub comprises a plurality of discharge fins distributed circumferentially around said axis, at least one portion of said discharge fins having a different density distribution depending on their angular position around the axis.

6. The intermediate casing hub according to claim 1, wherein each discharge fin is equipped with a spring system attached on the one hand to the pivot and on the other hand to the discharge stream duct so as to apply a moment to the discharge fin tending to bring said fin into its open configuration.

7. The intermediate casing hub according to claim 1, further comprising a damping system of the discharge fins.

8. An intermediate casing for a bypass turbine engine comprising an intermediate casing hub according to claim 1.

9. A bypass turbine engine comprising an intermediate casing according to claim 8.

* * * * *